INVENTORS
EARL D. JACOBS
WILBUR L. ZINGERY

BY

ATTORNEY

INVENTORS
EARL D. JACOBS
WILBUR L. ZINGERY
BY
ATTORNEY

INVENTOR.
EARL D JACOBS
WILBUR L. ZINGERY

ATTORNEY

June 30, 1970 E. D. JACOBS ET AL 3,517,560
ACCELEROMETER
Filed March 23, 1965 5 Sheets-Sheet 5

INVENTORS
EARL D. JACOBS
WILBUR L. ZINGERY
BY
ATTORNEY

_United States Patent Office_

3,517,560
Patented June 30, 1970

3,517,560
ACCELEROMETER
Earl D. Jacobs, Tustin, and Wilbur L. Zingery, Long Beach, Calif., assignors to North American Rockwell Corporation, a corporation of Delaware
Filed Mar. 23, 1965, Ser. No. 442,100
Int. Cl. G01p 15/02
U.S. Cl. 73—516          16 Claims

ABSTRACT OF THE DISCLOSURE

An accelerometer comprising at least one laser consisting of a lasing element and a pair of parallel reflectors, one of which is partially transmitting to provide an output. The light generated by the lasing element is reflected back and forth between the parallel reflectors. The optical path length of the laser beam is changed as a function of acceleration which causes the beam to change frequency. This change in frequency is detected by comparing the beam with a second reference laser beam which may be derived from the same lasing element or from a different one.

---

This invention pertains to accelerometers and more particularly to laser accelerometers.

Lasers, as now known generally, frequently consist of a pair of parallel reflectors between which is placed a piece of material which may be either a gas (He-Ne) or a solid (ruby) or may even be a liquid that is brought into a condition of negative absorption for some frequencies. In order to obtain a useful power output from the laser, at least one of the reflectors is made partially transmitting. As a result of spontaneous and stimulated emission, light is generated within the laser. The generated light travels the length of the laser and is reflected back and forth between the parallel reflectors. At the time of each reflection a fraction of energy is lost or taken off as the useful output.

According to the present invention, the optical path length of a gas laser is changed as a function of acceleration, which, in turn, causes the output radiation from the laser change in frequency. This change in frequency, detected by beating the tuned laser output beam with a second reference laser beam, indicates the direction and magnitude of an applied acceleration.

According to the present invention, it has been found that an accelerometer utilizing a gas laser exhibits the desirable qualities of small size, high sensitivity, and mechanical and electrical simplicity. For example, the sensitivity of a one milliwatt, 0.5 cubic inch, accelerometer will approach one micro-$g$ over a range from one micro-$g$ to 500$g$.

Two physical facts about gas lasers which make them particularly adaptable for use as acceleration measuring units are their extremely narrow line width and their inherent direct digital output.

Whereas in most accelerometer instruments, simplification of the mechanical structure has resulted in increased complexity and cost of the electronics required, an accelerometer utilizing a laser will substantially simplify electronics requirements. This instrument will provide a digital output.

The frequency of oscillation of a gas laser is one of the purest sources of electromagnetic energy available. This frequency is mainly dependent upon the spacing between the mirrors comprising the optical resonator. The frequencies obtained are of the order of $10^{14}$ c.p.s. and the theoretical resolution is of the order of a fraction of a cycle per second. When the optical path length of the resonator is changed, the laser is tuned and its output radiation changes frequency. If two lasers are properly connected and adjusted, their outputs may be heterodyned and the difference frequency between the two will be observed. By this means small frequency changes and hence small changes in the optical pathlengths of the lasers can be directly measured. By coupling the path length to acceleration in a manner such that one laser remains uncoupled and the other is tuned, or by coupling two laser beams to acceleration such that they are affected differently by the acceleration, or by coupling both lasers in an opposite sense such that one increases in length and the other decreases, a direct frequency output proportional to acceleration will be obtained.

The advantage of using a gas laser as the frequency source should be made clear. Since the frequency of oscillation is of the order of $10^{14}$ c.p.s. and the theoretical resolution is better than 1 c.p.s., changes in the optitcal path of the order of one part in $10^{14}$ can be observed. With this tremendous sensitivity, entirely new species of stress sensitive materials may be used as the acceleration "sensor." By using liquid or solid laser materials, the linewidth would be greater but the laser may have other useful characteristics, such as long lifetime, small, and no moving parts.

There are many ways the resonator may be tuned by acceleration. One very practical means is to allow the acceleration to result in a change in the index of refraction of a small region (not the lasing material) within the optical cavity. The region of index change may be a gas or a solid or a liquid.

Another means of tuning the resonator would be to allow the sensed acceleration to displace the reflecting plates (mirrors).

Advantages to be found in using a gas sensor include its stability over long time periods and the lack of hysteresis under widely fluctuating environmental conditions.

The advantage in using the solid sensor is the great sensitivity of refractive index change to stress and its rapid response to acceleration change.

Variation in ambient temperature or field conditions will not affect the measurement in a properly mechanized system since these effects will cancel in first order.

It is, therefore, an object of this invention to provide a laser accelerometer.

It is another object of this invention to provide an improved accelerometer utilizing the frequency change in the oscillations of a laser.

It is still another object of this invention to provide an improved accelerometer utilizing a heterodyning action between two laser beams to determine a frequency difference which is a function of acceleration.

It is a further object of this invention to provide a laser accelerometer exhibiting the qualities of small size, high sensitivity and mechanical and electrical simplicity.

These and other objects will become more apparent from the following description of the laser accelerometer taken in conjunction with the following drawings in which:

FIG. 1$a$ is a projected schematic illustrating the relative position of the major components of a two-axis laser accelerometer;

FIG. 1$b$ is a block diagram illustrating the two-axis embodiment of FIG. 1$a$;

Figure 1A:
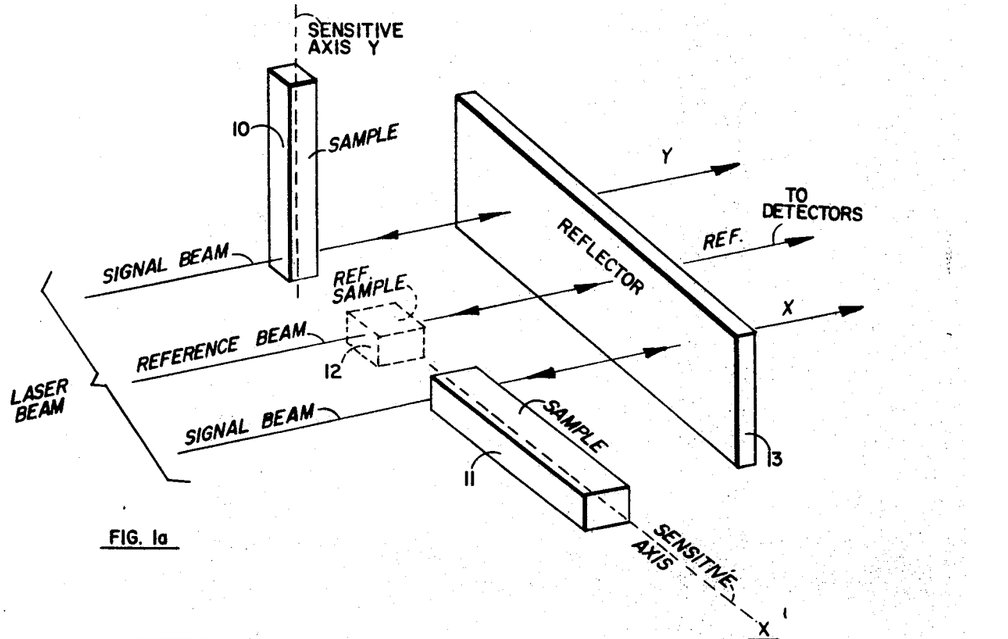
Figure 1B:
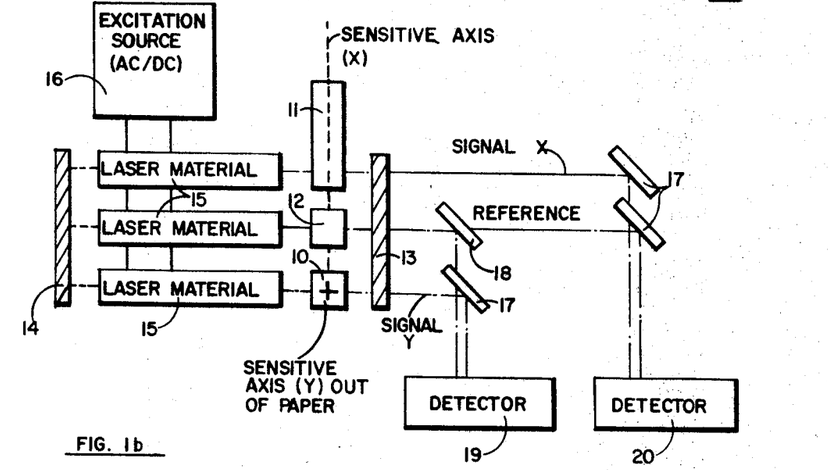

Referring to FIGS. 1a and 1b, three identical laser materials 15 are excited by an external source of power (AC or DC) 16. The generated light beams are reflected back and forth and amplified through stimulated emission in a resonant cavity formed by reflectors 13 and 14. Reflector 14 is totally silvered and reflector 13 is highly reflecting (approximately 99.5 percent reflecting) but allows part of the beam energy to pass through and out of the resonant cavity.

Three sensor samples 10, 11 and 12 are positioned such that each beam passes through one of the sensors. Sensor 10 is adapted to sense the acceleration along the Y axis, sensor 11 senses the acceleration along the X axis and sensor 12 is a reference sample which does not sense (respond to) accelerations.

The two sensor samples 10 and 11 are comprised of a rectangular shaped housing containing a gas. The longest rectangular axis is placed parallel to the axis of acceleration to be sensed, for sample 10, the Y axis, and for sample 11, the X axis. One end of each sample is placed in the path of a laser beam. Accelerations along the sensitive axis will cause a pressure gradient along the samples axis which in turn will bunch the gas molecules to one end of the rectangular housing changing the index of refraction seen by the laser beam. This change in the index of refraction is proportional to the density of the gas.

The reference sample 12 is shown as a small square housing containing a gas. This reference sample is designed such that its index of refraction does not change substantially with changes in acceleration. Since the X and Y beams are continuously referenced on the reference beam, the direction as well as the magnitude of the acceleration may be determined.

The beam passing through sensor 11 is diverted by a fully silvered mirror 17 to a detector 20. Also diverted to detector 20 by a mirror 17 is the beam that passes through reference sensor 12. This reference beam is also diverted by another partially silvered mirror 18 to a detector 19. The beam passing through sensor 10 is diverted by a fully silvered mirror 17 to detector 19.

Detectors 19 and 20 detect the difference in frequency between the reference sensor beam and the beams from sensors 11 and 10, respectively, and supply a signal indicative of the sensed accelerations along the Y and X axis, respectively.

The components 10 to 15 form an optical resonator or cavity. The resonator cavity will be defined as the space between the two reflectors 13 and 14. The actual length of the cavity (distance between reflectors 13 and 14) will be designated L.

An extremely small resolution (sensitivity) of one part in $10^{14}$ may be realized by a change in the cavity length of one part in $10^{14}$ or by a change of the refractive index of the medium of one part in $10^{14}$. This sensitivity results from the resonance condition that an integral multiple of half wavelengths must fill the resonator cavity. For a cavity of length L, $$L = \frac{N\lambda}{2}$$
$$= \frac{Nc}{2\nu}$$

and $$\frac{dL}{L} = -\frac{d\nu}{\nu}$$

where:

$\lambda$ = wavelength of the light,
N = number of half wavelengths between the opposite reflectors,
c = speed of light in a vacuum,
$\nu$ = speed of light in the medium.

Also, since the refractive index is $$n = \frac{c}{v} = \frac{c}{\lambda\nu}$$

for a fixed mechanical length, $$-\frac{d\nu}{\nu} = \frac{dn}{n}$$

The ability to obtain extreme sensitivity and range results from the unusually narrow fractional linewidth available in an optical resonator. The actual linewidth of the oscillation is many, many orders of magnitude less than the heretofore available fluorescent line. The theoretical oscillation linewidth is given by $$\Delta\nu_{osc} = \frac{4\pi h\nu}{P} \Delta\nu_{cavity}$$

where:

$\nu$ = oscillation frequency
h = Planck's constant
P = power in the laser oscillation
$\Delta\nu_{cavity}$ = cavity halfwidth at frequency $\nu$.

For typical values, $\Delta\nu_{osc}$ is of the order of 0.01 c.p.s. It is not required to obtain this theoretical linewidth for precision instrument applications. Linewidths which have been experimentally observed in poorly designed systems would be quite adequate for sensor applications.

The above mentioned cavity length change may be mechanized by providing for an acceleration induced displacement change of reflecting plates 13 or 14 or by a stress induced refractive index change, such as is done in FIGS. 1a and 1b for example, by means of elements 10, 11 and 12.

The stress sensors (samples) may be either a gas or a solid or a liquid.

For a gas under acceleration, the density distribution is given by $$\rho(x) = \rho_0 \exp(-\beta ax)$$

where:

$\rho_0$ = gas density at the position $x=0$
$a$ = the component of acceleration along the sensitive axis
$\beta = m/kT$
m = atomic mass
k = Boltzman's constant
T = temperature The index distribution is given by $$n(x) \simeq 1 + (n_0 - 1)(1 - \beta ax)$$

For a typical instrument with a gas sensor chamber 1 cm. long, the scale factor would be about $5 \times 10^5$ c.p.s./g. with a linewidth of 1 c.p.s. and measuring the frequency to within 0.1 linewidth, a sensitivity of better than one micro-g over a range of $10^7$ can be obtained.

The advantage of a gas type sensor lies in its stability over long time periods and the lack of hysteresis under widely fluctuating environmental conditions.

Using a solid as the stress sensor medium would give even greater sensivity. The solid, a photoelastic type of material, which may be an epoxy or glass, would be stressed by means of a proof mass under acceleration. Materials with fringe values of about 10 lb./in.$^2$/wavelength-inch are readily available for this purpose.

The advantage of using the solid stress sensor is the great sensitivity of refractive index change to stress.

Figure 2:
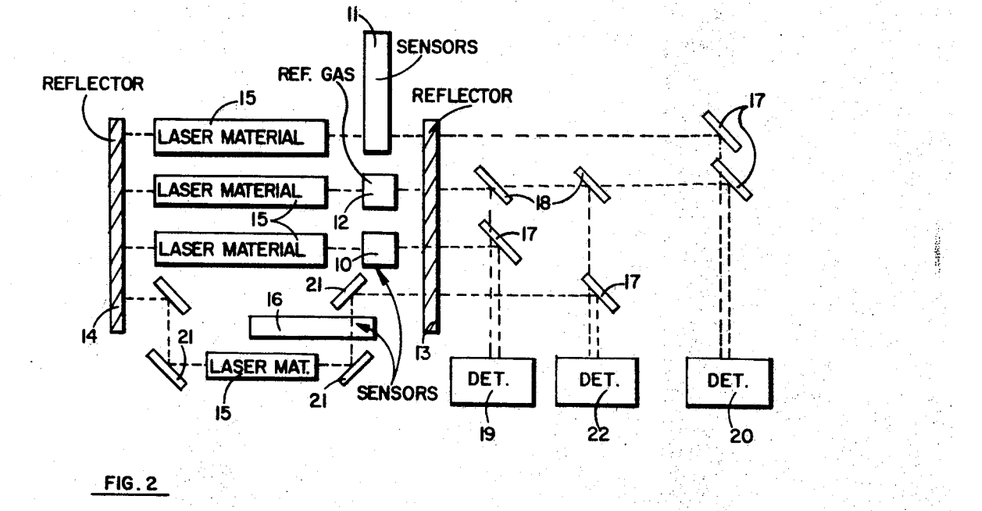
FIG. 2 is a block diagram illustrating a three-axis laser accelerometer.

Referring to FIG. 2, one possible configuration for a three-axis gas laser accelerometer is shown incorporating the two-axis accelerometer shown in FIG. 1b. Four laser materials 15 are utilized along with additional fully silvered mirrors 21. An additional sensor 16 is positioned to detect acceleration along the third axis and to change the index of refraction of one of the laser beams. An additional detector 22, along with additional mirrors 17 and 18, are used to reflect the beam from reference sensor 12 and the additional third-axis sensor 16 onto detector 22 to thereby detect the acceleration along the third axis. The excitation source 16 is omitted for clarity.

Figure 3A:
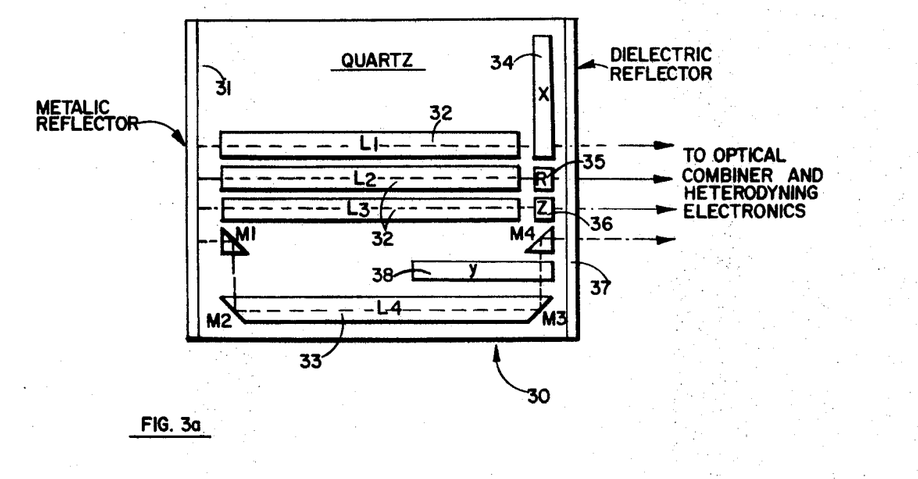
FIG. 3a is a top view of a compact quartz based three-axis laser accelerometer.
Figure 3B:
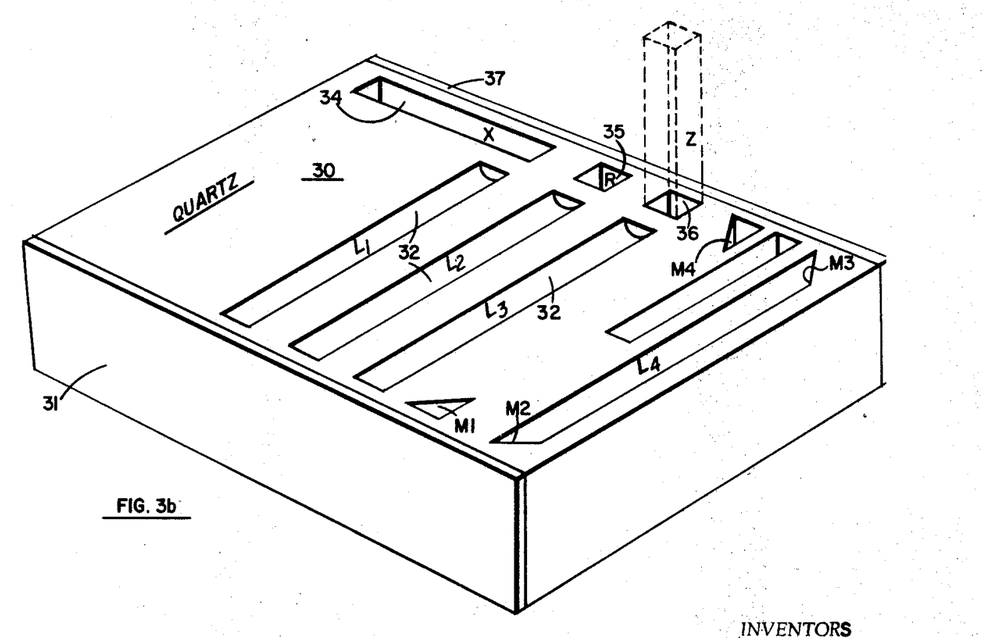
FIG. 3b is a projected view of one-half of the quartz based laser accelerometer of FIG. 3a illustrating relative positioning of the components.

In FIGS. 3a and 3b there is shown one possible configuration of a three-axis accelerometer utilizing an all quartz housing 30 and a somewhat similar placement of components as was shown in FIG. 2.

Cavities for the laser material, which may be a mixture of He-Ne, and the sample or sensing material are ground into the surfaces of quartz block 30. Cavities 32 will contain the material for lasers L1, L2 and L3; a cavity 33 will contain the laser material for laser L4 along with mirrors M2 and M3. Mirrors M1 and M4 are reflective surfaces placed in block 30 to direct the beam from mirrors M2, M3 and laser L4 onto metallic total reflector 31 and dielectric (partial) reflector 37. Reflectors 31 and 37 are positioned on opposite ends of block 30. Interposed in the optical path of laser L1 is the X-axis acceleration sensor cavity 34. The reference cavity 35 is interposed in the optical path of laser L2 and the Z-axis acceleration sensor cavity 36 is interposed in the optical path of laser L3. The Y-axis acceleration sensor cavity 38 is interposed in the optical path of laser L4.

FIG. 3b illustrates only a first half of the total quartz based accelerometer after the cavities are filled, an identical second half is placed over the first half, and the unit is sealed. If DC excitation is used on the laser materials, electrodes may be inserted through the block into the cavities to cause a discharge (when gas laser used). If AC or RF excitation is used, it may be inductively coupled through the block with the electrodes outside the block material. Materials other than quartz may be used as the base material. The specific form of excitation is not shown for purposes of clarity.

Some of the advantages to be found in such an integrated construction are the improved stability against vibration of the reflector surfaces, and the small separation of laser materials so that the laser beams may be reflected from areas of the reflector surfaces which are a small distance apart; the vibration of the reflector plates and the differential expansion along the reflectors caused by temperature gradients will have little effect because of the small distance between beams on the reflectors and by using a reference sample which is in the same temperature and field environment as that of the signal samples, bias shifts caused by temperature drifts and ambient field changes are highly compensated for.

Figure 4:
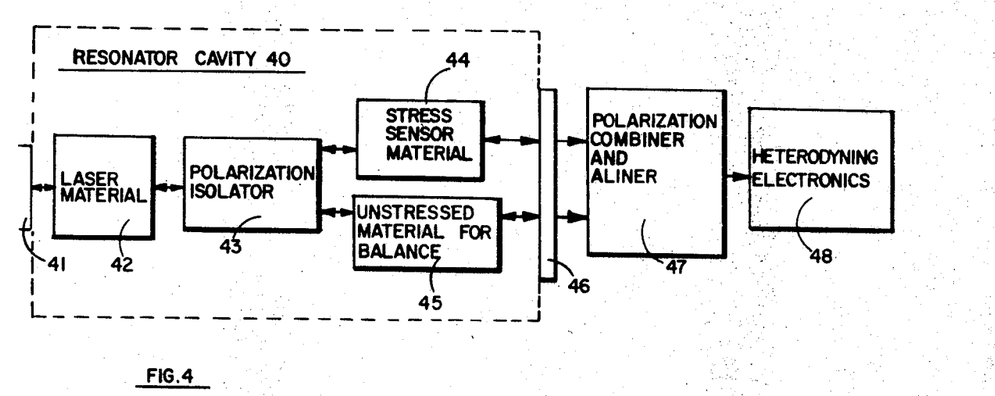
FIG. 4 is a block diagram illustrating a laser accelerometer utilizing a polarization isolator to achieve beam splitting.

In FIG. 4 is an accelerometer utilizing crossed polarization laser beams which share the same laser medium and (in some cases) the same reflector surfaces. The laser material 42 for generating the laser beam is contained within a resonator's cavity 40. Reflectors 41 and 46 define the length of the resonator cavity. A polarization isolator 43 is placed in the path of the laser beam to resolve the laser beam into two beams of different polarizations. The stress sensor material 44 which may be either gas or solid or liquid, as previously stated, is inserted into the path of one of the polarized laser beams. The unstressed material for balance 45 serves a similar function as the reference sensor 12 and is inserted into the path of the other polarized laser beam. The beams from sensor 44 and balance material 45 are combined and alined in a polarization combiner and aliner 47, which is shown external to the resonator cavity but which may be placed inside the cavity between elements 45 and 46 so that the two beams may be recombined into a coincident beam which would then share the same reflector area at 46. This creates greater stability from temperature gradients. The output of polarization combiner and electronics 47 is applied to heterodyning electronics 48 which determines the difference in sign and frequency between the two beams to give an indication of the magnitude of the acceleration sensed by sensor 44. Reflector 41 is a total reflector and reflector 46 is a dielectric (frequency selective) reflector which allows high reflection (99.5 percent) of selected wavelengths of energy.

Figure 5:
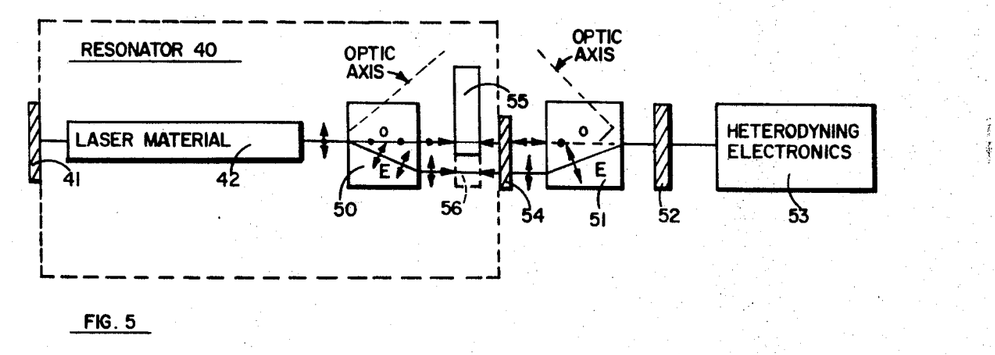
FIG. 5 illustrates another embodiment of the invention utilizing beam splitting.

In FIG. 5, resonator cavity 40 is comprised of a laser material 42, a total reflecting mirror 41, a highly reflecting mirror 54, an acceleration sensor 55, and a reference sensor 56, which may be a second axis sensor instead of a reference sensor.

A doubly refracting material 50 and 51 is used to separate the laser beam into extraordinary rays E and ordinary rays O. The optic axis may be oriented otherwise to provide other components of polarization. The E and O rays are suggested here because they are well known components. The separated E and O rays are passed through sensors 56 and 55, respectively, through partial reflector 54 and recombined by refracting material 51. The recombining may take place between elements 56 and 54 as previously explained. Element 52 is an analyzer which transmits only that component of linear light that is parallel to its transmission direction. Heterodyning electronics 53 receives the light passed by analyzer 52 and from the frequency shift determines the amount and direction of the sensed acceleration.

Figure 6:
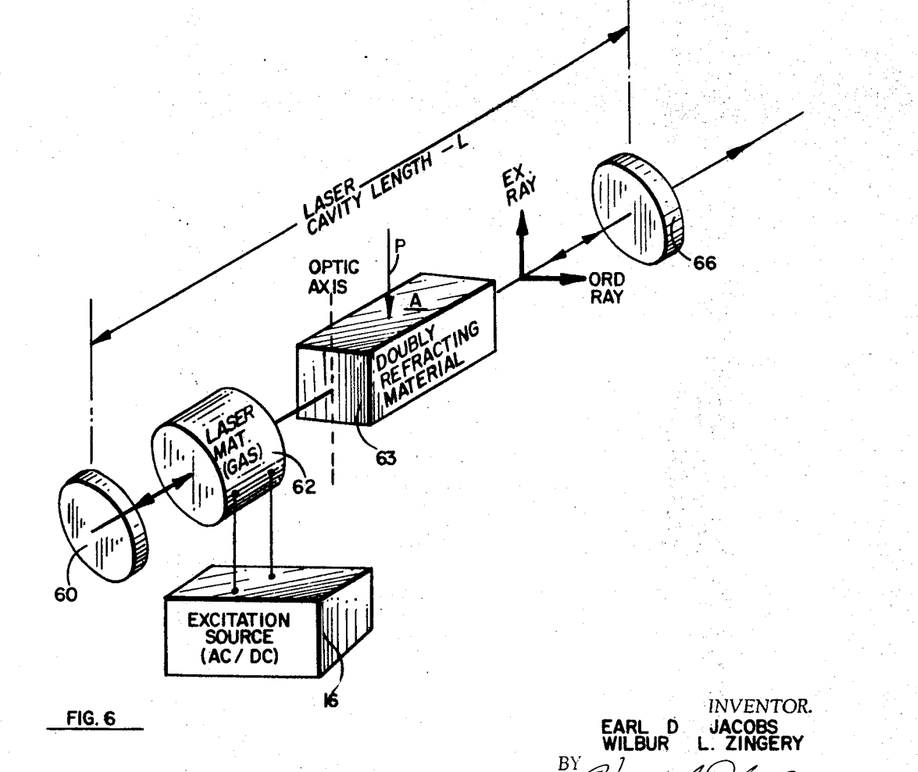
FIG. 6 is a projected schematic illustrating the relative positioning of components in a laser accelerometer utilizing coincident laser beams with crossed polarization and a doubly refracting material as the acceleration sensor.

Referring to FIG. 6, a laser cavity having a length L is comprised of a laser material (gas) 62, which is excited by excitation source 16. The light generated is fully reflected by a reflector 60 and partially reflected by a reflector 66. A doubly refracting material 63 is inserted in the optical path of laser material 62 and partially reflective mirror 66. The optic axis of doubly refracting material 63 is arranged so that the extraordinary rays E and ordinary rays O are colinear as shown in FIG. 6. Because of the nature of doubly refracting material 63, the E and O waves, which are plane polarized in mutually orthogonal directions, see different optical path lengths resulting in a frequency difference between the two waves. The acceleration to be sensed is applied directly to refracting material 63 by means of force P. This may be done by placing a mass on surface A of material 63 such that the mass under the influence of acceleration will stress the material. The deformation of material 63 will in turn change the frequency of the extraordinary and ordinary waves passed. In other words, in the presence of acceleration, the difference in path lengths seen by the E and O waves is changed resulting in a change in the difference frequency therebetween. This change in the difference frequency is sensed to determine the acceleration. Again, the optic axis of material 63 may be at some other angle, thus causing other components of polarization, or the material may be biaxial and still yield a similar differential effect on the frequency of the polarization components. The orientation of the optic axis and the illustration of the E and O rays only serve for clarity since the effects on these components are well known.

Figure 7:
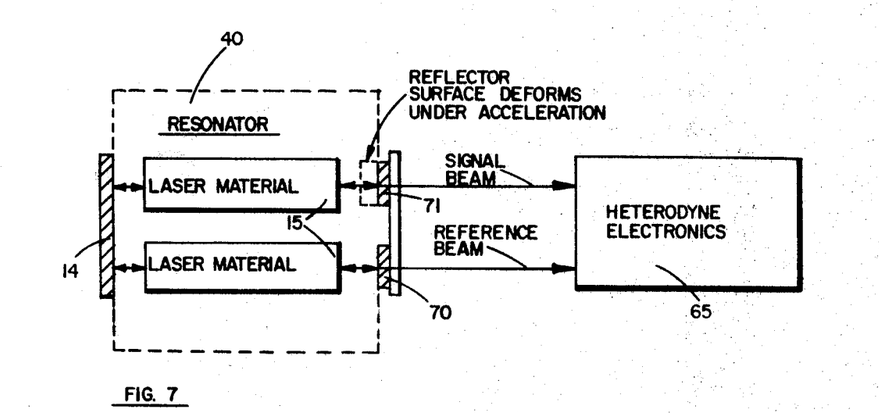
FIG. 7 is a block diagram illustrating a laser accelerometer utilizing an acceleration sensitive reflector.

In FIG. 7, resonator 40 is comprised of highly reflective surface 14, and laser materials 15. A partial reflector 71 which deforms under acceleration is placed in the optical path of the laser beam. A second partially reflecting non-deforming material 70 is placed in the path of the other laser beam. Under the influence of acceleration, the cavity length and in turn the optical frequency is changed by the deformation of reflector 71. Heterodyne electronics 65 detects the difference in frequency between the signal beam and the reference beam and provides a signal indicative of the sensed acceleration. The signal beam and reference beam are shown as separate beams. However, the two beams could be of different polarization and share the same laser material as do the beams shown in FIG. 5.

Figure 8:
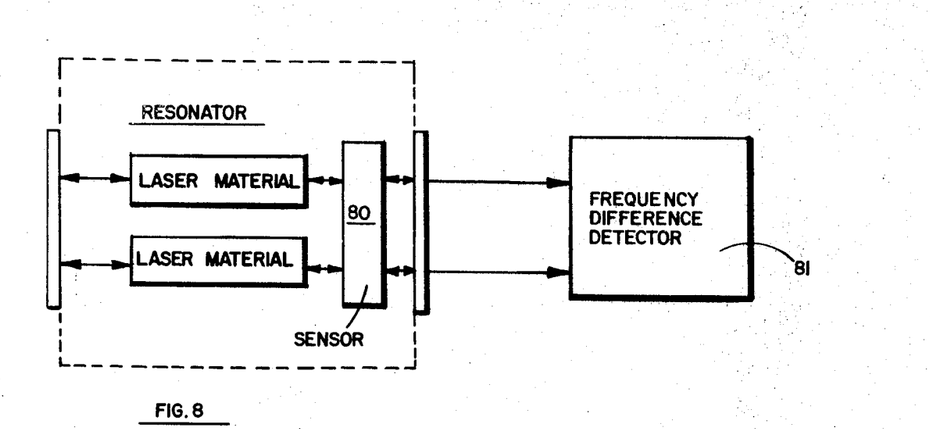
FIG. 8 is a block diagram illustrating a laser accelerometer utilizing an acceleration sensor in a push-pull configuration.

Referring to FIG. 8, a gas sensor 80, which may be identical to either sensor 10 or 11, is placed in the path of both laser beams. The refractive index of sensor 80 will change in a push-pull manner (one end increasing in density, the other end decreasing). The two beams reaching a frequency difference detector 81 will have a frequency difference which is a measure of acceleration. In this instance the direction of acceleration is lacking. It is possible to provide a frequency reference (standard) having a frequency equal to a zero acceleration condition so that it would be possible to find the difference between either one or both beams and the reference frequency.

While there has been described herein preferred embodiments of the invention, it will be obvious to those persons skilled in the art that various changes and modifications may be made therein without departing from the invention; it is, therefore, the intent in the appended claims to cover all such changes and modifications as fall within the true spirit and scope of this invention.

We claim:
1. An accelerometer comprising in combination:
   means for generating a beam of coherent light;
   means for splitting said beam into first and second beams;
   a first material having an index of refraction which changes as a function of sensed acceleration, said first material interposed in the path of said first beam;
   a reference material having a substantially fixed index of refraction similar to the index of refraction of said first material in the absence of sensed acceleration, said reference material interposed in the path of said second beam;
   means for recombining said first and second beams;
   a partial reflector interposed in the path of said first and second beams and positioned between said materials and said recombining means;
   a substantially total reflector positioned parallel to said partial reflector and interposed in the path of said beam of coherent light so as to form a resonant cavity with said coherent light generating means and said partial reflector such that a change in the index of refraction of said first material causes a change in the effective length of said resonant cavity changing the frequency of said first beam as a function of sensed acceleration; and
   means responsive to said recombined beams for indicating the difference in frequency between said beams.

2. An accelerometer according to claim 1 wherein said means for splitting said beam is a polarization isolator and said means for recombining said beams is a polarization combiner and aliner.

3. An accelerometer comprising in combination:
   means for generating a beam of coherent light;
   a doubly refracting material interposed in the path of said beam for splitting said beam into first and second colinear beams, said first and second beams having different directions of polarization, said material having an index of refraction which changes as a function of sensed acceleration;
   a partial reflector interposed in the path of said beams;
   a substantially total reflector positioned parallel to said partial reflector so as to form a resonant cavity with said coherent light generating means and said partial reflector such that a change in the index of refraction of said material causes a change in the effective length of said resonant cavity changing the frequencies of said first and second beams as a function of sensed acceleration; and
   means responsive to the change in frequency of said beams for providing a signal indicative of said sensed acceleration.

4. An accelerometer as claimed in claim 3 wherein said source of coherent light comprises a laser material and means cooperatively associated with said laser material for exciting said material into a state of emission.

5. An accelerometer comprising in combination:
   a partial reflector surface and a total reflector surface positioned parallel and opposite to each other forming a resonant cavity having a length equal to the distance between said reflector surfaces;
   a first and a second laser material for generating a first and a second beam, respectively, perpendicular to said reflecting surfaces, said materials positioned parallel to each other;
   means cooperatively associated with said laser materials for exciting said materials into a state of emission;
   acceleration sensor means having an index of refraction which changes as a function of acceleration interposed in the path of said first beam between said first material and one of said reflector surfaces so as to effectively change said resonant cavity length thereby changing the frequency of said first beam as a function of sensed acceleration;
   reference means having an index of refraction which remains constant in the presence of acceleration interposed in the path of said second beam between said second material and one of said reflector surfaces; and
   means for detecting the frequency difference between said beams.

6. An accelerometer comprising in combination:
   a first partial reflector surface and a total reflector surface positioned parallel and opposite to each other forming a first resonant cavity, said first resonant cavity adapted to remain of substantially constant length in the presence of acceleration;
   a second partial reflector surface positioned adjacent said first partial reflector forming a second resonant cavity, said second reflector adapted to change the length of said second resonant cavity as a function of sensed acceleration;
   a first and a second laser material for generating first and second beams, respectively, said material positioned within said first and second resonant cavities, respectively;
   means cooperatively associated with said laser materials for exciting said materials into a state of emission; and
   means for detecting the difference in frequency between said beams.

7. An accelerometer comprising in combination:
   a partial reflector surface and a total reflector surface positioned parallel and opposite to each other forming a resonant cavity having a length equal to the distance between said reflector surfaces;
   first, second and third laser materials for generating first, second and third beams, respectively, which oscillate between said reflector surfaces;
   means cooperatively associated with said laser materials for exciting said materials into a state of emission;
   first and second acceleration sensors having indices of refraction which change as a function of acceleration interposed in the path of said first and second beams, respectively, so as to effectively change the resonant cavity length seen by said first and second beams as a function of sensed acceleration, said first sensor adapted to sense acceleration along a first axis and said second sensor adapted to sense acceleration along a second axis;

a third sensor having an index of refraction substantially identical to the index of refraction of said first and second sensors in the absence of sensed accelerations, which does not substantially change its index of refraction as a function of sensed acceleration, said third sensor positioned within said resonant cavity interposed in the path of said third beam; and means for detecting the frequency difference between said first and third beams and between said second and third beams, so as to provide an indication of the acceleration sensed along said first and second axes respectively.

8. An accelerometer as claimed in claim 7 wherein said resonant cavity is formed from a solid material.

9. An accelerometer as claimed in claim 7 wherein said acceleration sensors are a gas, the density of which changes as a function of sensed acceleration.

10. An accelerometer comprising in combination:

a partial reflector surface and a substantially total reflector surface positioned parallel and opposite each other forming a resonant cavity having a length equal to the distance between said reflector surfaces;

first, second, third and fourth laser materials for generating first, second, third and fourth beams, respectively, which oscillate between said reflector surfaces;

means cooperatively associated with said laser materials for exciting said materials into a state of emission;

first, second and third acceleration sensors having indices of refraction which change as a function of sensed acceleration interposed in the path of said first, second and third beams, respectively, so as to effectively change the length of said resonant cavity for said first, second and third beams respectively, said first, second and third sensors adapted to sense the acceleration along first, second and third axes, respectively;

a reference sensor having a fixed index of refraction substantially identical to the index of refraction of said first, second and third sensors in the absence of sensed acceleration, said sensor interposed in the path of said fourth beam; and means for detecting the frequency difference between said first, second and third beams and said fourth beam, so as to provide an indication of the acceleration sensed along said first, second and third axes, respectively.

11. An accelerometer comprising in combination:

means for generating a beam of coherent light;

means for splitting said beam into first and second beams;

a first material having an index of refraction which changes as a function of sensed acceleration, said first material interposed in the path of said first beam;

a reference material having a substantially fixed index of refraction similar to the index of refraction of said first material in the absence of sensed acceleration, said reference material interposed in the path of said second beam;

means for recombining said first and second beams;

a partial reflector interposed in the path of said recombined first and second beams;

a substantially total reflector positioned parallel to said partial reflector and interposed in the path of said beam of coherent light so as to form a resonant cavity with said coherent light generating means and said partial reflector such that a change in the index of refraction of said first material causes a change in the effective length of said resonant cavity changing the frequency of said first beam as a function of sensed acceleration; and means responsive to said recombined beams for indicating the difference in frequency between said beams.

12. An accelerometer according to claim 11 wherein said means for splitting said beam is a polarization isolator and said means for recombining said beams is a polarization combiner and aliner.

13. An accelerometer comprising, in combination:

a source of coherent light, said source comprising:
 a laser material;
 a total reflector and a partial reflector positioned parallel to each other on opposite ends of said laser material so as to form a resonant cavity; and
 means cooperatively associated with said laser material for exciting said material into a state of emission;

a path for said light;

means responsive to acceleration to vary the effective length of said path, said means varying the effective path length of said resonant cavity;

means for providing a reference path for said light which is not influenced by said acceleration responsive means; and detector means responsive to the light from said path and the light from said reference path for providing a signal which varies as a function of the length of said path.

14. An accelerometer comprising, in combination:

a source of coherent light;

a path for said light;

means responsive to acceleration to vary the effective length of said path, said acceleration responsive means being a material, the index of refraction of which varies as a function of acceleration;

means for providing a reference path for said light which is not influenced by said acceleration responsive means; and detector means responsive to the light from said path and the light from said reference path for providing a signal which varies as a function of the length of said path.

15. An accelerometer comprising, in combination:

a source of light, said source comprising:
 a laser material;
 total reflector means and partial reflector means positioned parallel to each other on opposite ends of said laser material so as to form a resonant cavity; and
 means cooperatively associated iwth said laser material for exciting said material into a state of emission;

a path for said light;

means responsive to acceleration to vary the length of said path, said means varying the length of said resonant cavity;

means for providing a reference path for said light which is not influenced by said acceleration responsive means; and detector means responsive to the light from said path and the light from said reference path for providing a signal which varies as a function of the length of said path.

16. An accelerometer comprising, in combination:

first and second sources of light, said sources comprising:
 first and second laser materials;
 means cooperatively associated with said laser materials for exciting said materials into a state of emission;

a first path for the light from said first light source;

acceleration responsive means comprising total reflector means and partial reflector means positioned parallel to each other on opposite ends of said first laser material so as to form a resonant cavity, at least one of said reflector means being movably mounted so as to move responsive to acceleration to vary the spatial length of said path for varying the spatial length of said resonant cavity;

means for providing a second path for the light from said second laser material which path is not influenced by said acceleration responsive means;

detector means responsive to the light from said paths for providing a signal which varies as a function of the spatial length of said first path.

References Cited

UNITED STATES PATENTS

| 2,948,152 | 8/1960 | Meyer | 73—514 |
| 3,071,008 | 1/1963 | Steele | 73—504 |
| 3,084,557 | 4/1963 | Von Ahlefeldt | 73—516 |
| 3,087,148 | 4/1963 | Ludewig | 73—88.5 XR |
| 3,166,673 | 1/1965 | Vickery et al. | 331—94.5 XR |
| 3,172,057 | 3/2965 | Bennett | 331—94.5 |
| 3,228,246 | 1/1966 | Rosenthal | 331—94.5 XR |

OTHER REFERENCES

An article entitled, "Laser Pressure Gauge," from "Measurement and Control," November 1964.

JAMES J. GILL, Primary Examiner

U.S. Cl. X.R.

73—517